UNITED STATES PATENT OFFICE.

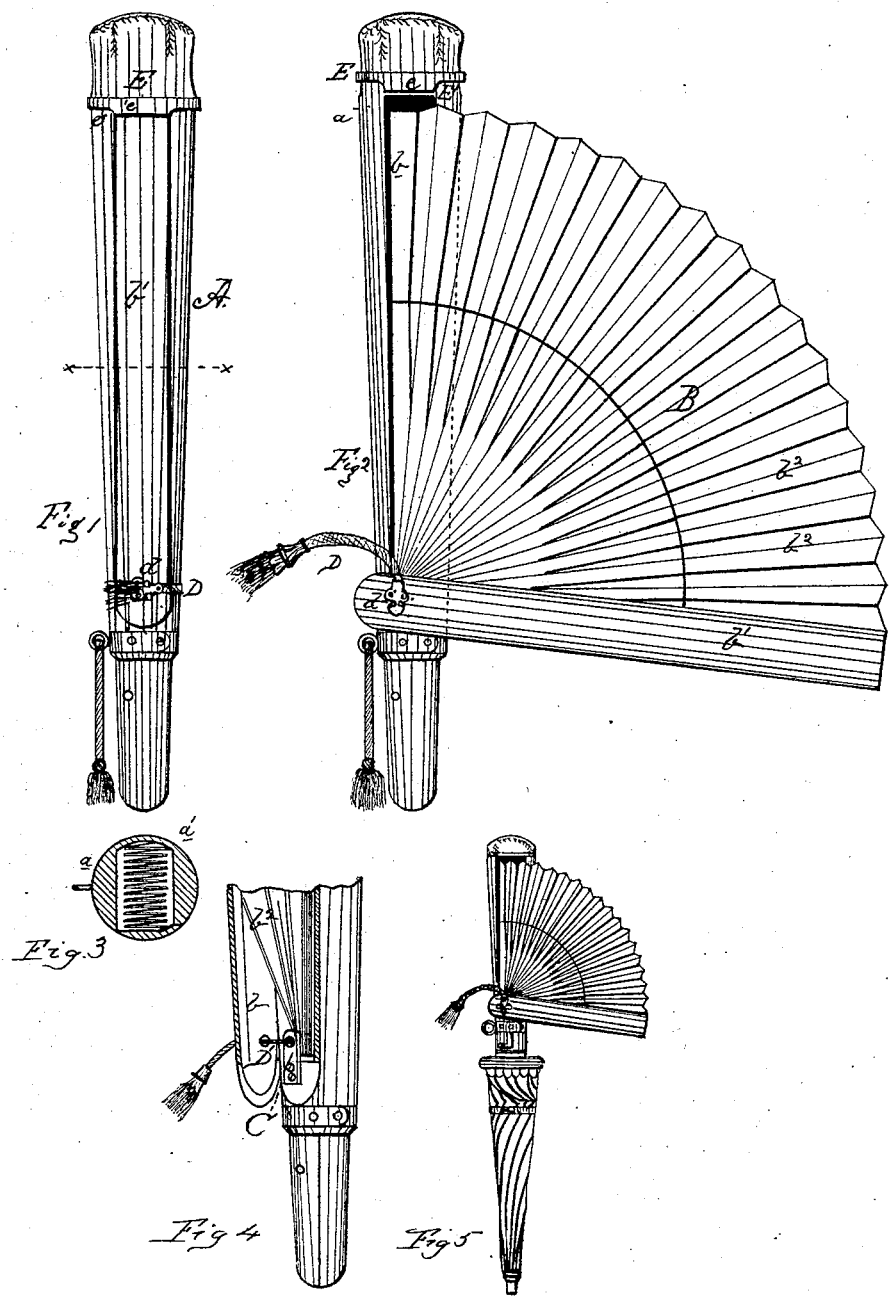

COMEGYS C. LUSBY, OF PHILADELPHIA, PA., ASSIGNOR OF ONE-HALF HIS RIGHT TO WILLIAM J. CHAMBERS, OF SAME PLACE.

IMPROVEMENT IN FANS.

Specification forming part of Letters Patent No. 145,666, dated December 16, 1873; application filed October 28, 1873.

*To all whom it may concern:*

Be it known that I, COMEGYS C. LUSBY, of Philadelphia, in the county of Philadelphia and State of Pennsylvania, have invented certain new and useful Improvements in Fans; and I do hereby declare the following to be a full, clear, and exact description of the invention, such as will enable others skilled in the art to which it pertains to make and use it, reference being had to the accompanying drawings, which form part of this specification, in which—

Figure 1 is a side view of the fan closed. Fig. 2 is a side view of the fan open. Figs. 3 and 4 are details. Fig. 5 is a view showing fan applied to parasol-handle.

My invention has for its object to provide a fan constructed and arranged especially for use in connection with parasols, canes, riding-whips, and other similar articles. The nature of my invention consists in the peculiar construction, combination, and arrangement of parts, as hereinafter fully described.

Referring to the accompanying drawing, A represents the stick of a parasol, or equivalent device, having its handle recessed, as shown at $a$, for the reception of the folding fan B, which fits snugly therein. The innermost leaf of the fan $b$ is made fast to the bottom or wall $a'$ of said recess $a$, an outer slat or shield, $b^1$, being fitted to fill up the recess after the fan is folded therein, in such manner as to completely conceal the internal leaves of said fan, as shown in Fig. 1. Through each of the leaves $b^2$, and through the clip C, which holds said leaves in place, and slat $b^1$, passes an elastic cord, D, which, when the fan is opened, gives, to allow the lower end of the slat $b^1$ to turn over and outside of the stick A, as shown in Fig. 2. The cord D is continued, so as to surround the stick when the fan is closed, being made fast in this position by a suitable retaining device, $d$. The upper end of the fan, when folded, is kept confined within the recess $a$ by means of the ring E, having a flange, $e$, cut away at $e'$. When said ring is turned, as it may be, to allow the narrow part of the flange $e$ to come in front of the recess $a$, the fan may be opened laterally, the cord D being at the same time unwound from the lower portion.

The fan, as thus constructed, may be inserted in the ordinary handle of a parasol, whip, or other device, as above stated, or it may be made separate therefrom, and then attached thereto by a bayonet-joint, or other equivalent means. In the latter case the fan may, at will, be detached and used independently, and the handle or stick A may have its configuration varied from that shown in the drawing.

What I claim as my invention is—

1. The combination, with a stick having a side recess elongated in the direction of its length, of a fan folding and expanding laterally into and from said recess, substantially as described and shown.

2. In combination with the handle or stick of a parasol, or other equivalent device, a folding fan opening laterally from the side of said handle or stick.

3. The stick or handle A, having the side recess $a$ for the reception of the fan B.

4. In combination with the stick A, having the recessed side $a$, the fan B, fitting in said recess, as shown and described.

5. In combination with the recessed stick A and fan B, the slat or shield $b^1$ for concealing said recess, as described.

6. The elastic joint D, arranged as shown, for the purpose set forth.

7. The ring E, having the flange $e$ cut away at $e'$ for holding the fan closed, as specified.

In testimony that I claim the foregoing I have hereunto set my hand this 23d day of October, 1873.

COMEGYS C. LUSBY.

Witnesses:
M. DANL. CONNOLLY,
GEO. C. SHELMERDINE.